United States Patent
Stone et al.

(10) Patent No.: US 6,642,923 B1
(45) Date of Patent: Nov. 4, 2003

(54) ALTERING THE SHAPE OF AN ARTWORK

(75) Inventors: Lincoln David Stone, Ryde (AU); Oliver Bock, London (GB)

(73) Assignee: Canon Information Systems Research Australia Pty Ltd., North Ryde (AU)

( * ) Notice: Subject to any disclaimer, the term of this patent is extended or adjusted under 35 U.S.C. 154(b) by 0 days.

(21) Appl. No.: 09/564,027

(22) Filed: May 4, 2000

(30) Foreign Application Priority Data

May 10, 1999 (AU) ............................. PQ0277

(51) Int. Cl.[7] ............................................. G06T 15/20

(52) U.S. Cl. ......................... 345/427; 345/419; 717/8

(58) Field of Search ................. 345/419, 427; 717/8

(56) References Cited

U.S. PATENT DOCUMENTS

| | | |
|---|---|---|
| 4,673,988 A | 6/1987 | Jansson et al. ............ 358/280 |
| 4,888,648 A | 12/1989 | Takeuchi et al. ........... 358/335 |
| 4,992,953 A | 2/1991 | Yoshida et al. ............ 364/512 |
| 5,197,120 A | 3/1993 | Saxton et al. ............. 395/139 |
| 5,214,755 A | 5/1993 | Mason ...................... 395/147 |
| 5,274,751 A | 12/1993 | Rosenberg ................ 395/117 |
| 5,357,603 A | 10/1994 | Parker ...................... 395/156 |
| 5,396,590 A | 3/1995 | Kreegar .................... 395/159 |
| 5,426,729 A | 6/1995 | Parker ...................... 395/155 |
| 5,448,688 A | 9/1995 | Hemingway .............. 395/141 |
| 5,450,536 A | 9/1995 | Rosenberg et al. ........ 395/148 |
| 5,450,539 A | 9/1995 | Ruben ...................... 395/155 |
| 5,513,309 A | 4/1996 | Meier et al. ............... 395/155 |
| 5,515,496 A | 5/1996 | Kaehler et al. ............ 395/159 |
| 5,535,320 A | 7/1996 | Gay et al. ................. 395/150 |
| 5,553,217 A | 9/1996 | Hart et al. ................ 395/148 |
| 5,561,753 A | 10/1996 | Coulombe et al. ........ 395/155 |
| 5,563,722 A | 10/1996 | Norris ...................... 358/453 |
| 5,570,462 A | 10/1996 | McFarland ............... 395/136 |
| 5,590,276 A | 12/1996 | Andrews .................. 395/182.04 |
| 5,602,974 A | 2/1997 | Shaw et al. ............... 395/114 |

(List continued on next page.)

OTHER PUBLICATIONS

Calingaert, *Assemblers, Compilers and Program Translation*, Computer Science Press, 1979, pp. 126 and 142–150.*
Fuller, *Using Autocad Release 10 With 3–D*, Third Edition, Delmar Publishers, 1989, Chapters 3,5,6,11,12 and 19.*
"Examiner's First Report" issued by the Australian Patent Office, Feb. 19, 2001.
Calingaert, P., "Assemblers, Compilers and Program Translation," Computer Science Press, Inc. (1979), ISBN 0–914894–23–4 (book).
Fuller, J., "Using AutoCAD: Release 10 with 3–D," 3[rd]ed., Delmare Publishers Inc. (1989), ISBN 0–8273–3484–2 (pbk.) (book).

Primary Examiner—Mark Zimmerman
Assistant Examiner—Lance W. Sealey
(74) Attorney, Agent, or Firm—Fitzpatrick, Cella, Harper & Scinto

(57) ABSTRACT

The artwork is defined by a tree structure having leaf nodes comprising objects and parent nodes comprising graphical operators. Each node has fields storing values indicative of horizontal and vertical alteration rules applicable to that node or its sub-tree. The method comprises a selection step, a traversal step and two application steps. In the selection step (300) a target area is selected for fitting the artwork. In the traversal step, the method traverses the nodes of the tree structure (318,342,336,338) traversing one or more of the said nodes. In the first application step, the method applies, for each one of the traversed nodes that is a leaf node, a horizontal alteration rule (344). The horizontal rule re-positions each point within the object comprising the leaf node to another point within a target area, whereby altering the shape of the artwork in a horizontal direction. In the second application step, the method applies a vertical alteration rule (346) in a similar manner as the first application step, whereby altering the shape of the artwork in a vertical direction.

51 Claims, 8 Drawing Sheets

U.S. PATENT DOCUMENTS

| | | | |
|---|---|---|---|
| 5,611,060 A | 3/1997 | Belfiore et al. | 395/341 |
| 5,648,908 A | 7/1997 | Chirn et al. | 364/470.06 |
| 5,649,216 A | 7/1997 | Sieber | 395/767 |
| 5,651,107 A | 7/1997 | Frank et al. | 395/344 |
| 5,652,901 A | 7/1997 | Slayden et al. | 395/789 |
| 5,664,133 A | 9/1997 | Malamud et al. | 345/352 |
| 5,680,629 A | 10/1997 | Slayden et al. | 395/789 |
| 5,687,331 A | 11/1997 | Volk et al. | 395/327 |
| 5,692,144 A | 11/1997 | Thrush | 395/339 |
| 5,721,851 A | 2/1998 | Cline et al. | 395/349 |
| 5,721,853 A | 2/1998 | Smith | 395/353 |
| 5,740,389 A | 4/1998 | Li et al. | 395/346 |
| 5,751,590 A | 5/1998 | Cannon et al. | 364/479.03 |
| 5,757,358 A | 5/1998 | Osga | 345/146 |
| 5,760,772 A | 6/1998 | Austin | 345/342 |
| 5,760,773 A | 6/1998 | Berman et al. | 345/347 |
| 5,801,692 A | 9/1998 | Muzio et al. | 345/339 |
| 5,805,163 A | 9/1998 | Bagnas | 345/345 |
| 5,815,151 A | 9/1998 | Argiolas | 345/342 |
| 5,825,368 A | 10/1998 | Wilks | 345/440 |
| 5,837,317 A | 11/1998 | Moriwaki et al. | 427/217 |
| 5,844,566 A | 12/1998 | Lecland et al. | 345/426 |
| 5,844,797 A | 12/1998 | Johnson | 364/400 |
| 5,860,073 A | 1/1999 | Ferrel et al. | 707/522 |
| 5,867,144 A | 2/1999 | Wyard | 345/146 |
| 5,870,711 A | 2/1999 | Huffman | 705/8 |
| 5,974,199 A | 10/1999 | Lee et al. | 382/289 |

* cited by examiner

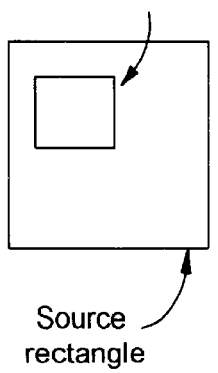
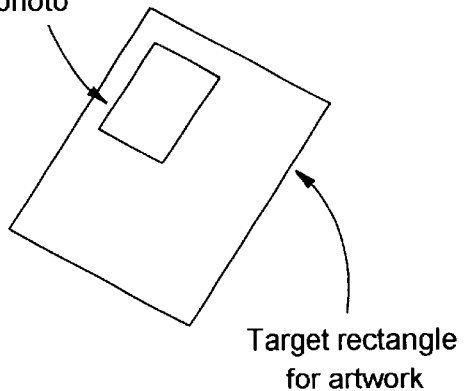
FIG. 4A
FIG. 4B
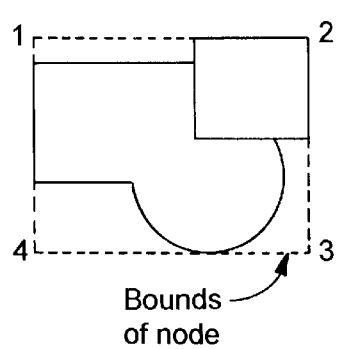
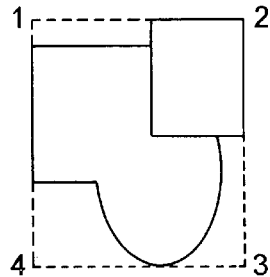
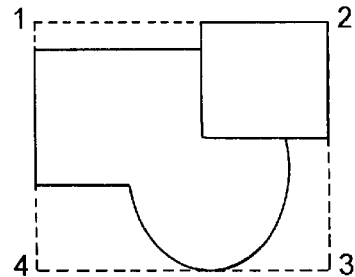
FIG. 5A
FIG. 5B
FIG. 5C Source Rectangle Target Rectangles

FIG. 6B  FIG. 6C

Source Rectangle

Target Rectangle

Source Rectangle

Target Rectangle

Source Rectangle

Target Rectangle

Source Rectangle

Target Rectangle

Source Rectangle

Target Rectangle

Source Rectangle

Target Rectangle

ALTERING THE SHAPE OF AN ARTWORK

FIELD OF INVENTION

The present invention relates to a method and apparatus for altering the shape of an artwork. The invention also relates to a computer readable medium comprising a computer program for altering the shape an artwork. The present invention also relates to a method and apparatus for generating an artwork, The invention also relates to a computer readable medium comprising a computer program for generating an artwork. The invention further relates to an artwork produced by the method of generating artwork.

BACKGROUND

Electronic photo-albums have become increasingly popular in recent times. These electronic photo-albums typically take the form of a collection of images stored using a non-volatile memory device, from which a user can retrieve the image for displaying on a display device. Usually, the images are gathered in digital form, and may, for example, be scanned by an electronic scanner, down-loaded from the Internet or produced by a digital camera. A collection of these images can be stored electronically to create an electronic photo-album, analogous to the traditional family photo-album, which uses photographic prints.

Presently, electronic photo-albums take the form of a collection of images, a user of the album being able to associate a caption or brief description with each image. For example, a user can collect a series of family photographs of a wedding, whether from a digital video or still camera, and associate a caption such as a date and a brief description of the event with each image. If desired, an electronic photo-album can be reproduced from the memory device by a high quality output device, such as a high-resolution colour printer, to produce an album substantially similar to a conventional photo-album.

An example of such a photo-album software application is Frameit Version 1.0 manufactured by DogByte Development, 612 Moulton Avenue, Suite 7, Los Angeles, Calif., U.S.A. This software application has the ability to provide frames or borders for electronic photographs These frames have predefined proportions and a slot into which the electronic photograph is fitted. However these predefined proportions of the frame are fixed and the photograph must be expanded, shrunk or cropped to fit into the slot. There is a need for a more flexible method in which images may be framed or bordered.

SUMMARY OF INVENTION

It is an object of the present invention to ameliorate one or more disadvantages of the prior art.

According to a first aspect of the invention, there is provided a method of altering the shape of an artwork, where the artwork is defined by a tree structure having leaf nodes comprising associated graphical objects and parent nodes comprising associated graphical operators, whereby sub-trees of the tree structure comprise associated graphical objects, wherein each node has fields adapted for storing values indicative of one or more associated alteration rules applicable to that node or that node's sub-tree. The method comprises the steps of selecting a target area for fitting the artwork; traversing one or more of the nodes; and applying, for each one of the traversed nodes, one or more said alteration rules associated with that node to each point within the graphical object associated with the traversed node to re-position each such point with respect to the target area, thereby altering the shape of the artwork.

According to a second aspect of the invention, there is provided a method of altering the shape of an artwork, where the artwork is defined by a tree structure having leaf nodes comprising graphical objects and parent nodes comprising graphical operators, and wherein each node has fields adapted for storing values indicative of one or more alteration rules applicable to that node or its sub-tree. The method comprises the steps of: selecting a target area for fitting the artwork; traversing one or more of the nodes; and applying, for each one of the traversed nodes that is a leaf node, a said alteration rule to each point within the graphical object comprising the leaf node to re-position said each point in a first direction with respect to the target area, thereby altering the shape of the artwork in said first direction.

According to a third aspect of the invention, there is provided a method of altering the shape of an artwork, where the artwork is defined by a tree structure having leaf nodes comprising graphical objects and parent nodes comprising graphical operators, and wherein each node has fields adapted for storing values indicative of one or more horizontal and vertical alteration rules applicable to that node or its sub-tree and a field for storing a value indicative of whether or not a mapping restriction is applicable to that node and its subtree if any. The method comprises the steps of: selecting a target area for fitting the artwork; traversing one or more of the nodes; applying, for each of the traversed nodes that has a value indicating a mapping restriction, an affine transformation to the sub-tree of that node; applying, for each one of the traversed nodes that is a leaf node and has a value indicating no mapping restriction, a said horizontal alteration rule to each point within the graphical object comprising the leaf node to horizontally re-position each such point with respect to the target area; and applying, for each one of the traversed nodes that is a leaf node and has a value indicating no mapping restriction, a said vertical alteration rule to each point within the graphical object comprising the leaf node to vertically re-position said each point with respect to the target area, thereby altering the shape of the artwork.

According to a fourth aspect of the invention, there is provided a method of adapting an artwork for later generation, where the artwork is defined by a tree structure having leaf nodes comprising graphical objects and parent nodes comprising graphical operators. The method comprises the steps of: attaching one or more fields to each node for designating horizontal and vertical alteration rules applicable to that node or its sub-tree; and adding values to said one or more fields indicative of a said horizontal and vertical alteration, and where the artwork is adapted to be altered in accordance with said alteration rules.

According to fifth through eighth aspects of the invention, there are provided apparatus for performing the respective methods of the above-described first through fourth aspects, utilizing the expedients disclosed in the specification for those purposes, and equivalents thereof.

According to ninth through twelfth aspects of the invention, there are provided computer readable media comprising respective computer programs for performing the methods of the first through fourth aspects described above, utilizing software implementations of the expedients disclosed in the specification for that purpose, and equivalents thereof.

BRIEF DESCRIPTION OF THE DRAWINGS

Embodiments of the invention are described with reference to the drawings, in which:

FIGS. 4A and 4B explains the operation of step 306 of FIG. 3A in more detail;

FIGS. 5A, 5B and 5C illustrate examples of mapping restricted nodes in accordance with the preferred embodiment;

FIGS. 6A, 6B and 6C show examples of how points with different vertical coordinates would be moved during altering if a stretch rule is used, in accordance with the preferred embodiment;

DETAILED DESCRIPTION

Figure 1A:
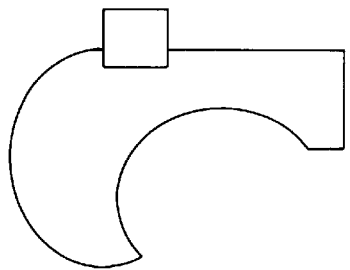
FIGS. 1A and 1B show an example of a simple artwork and an associated composition tree in accordance with the preferred embodiment.

Where reference is made in any one or more of the accompanying drawings to steps and/or features, which have the same reference numerals, those steps and/or features have for the purposes of this description the same function (s) or operation(s), unless the contrary intention appears.

Overview of the Preferred Method

The principles of the preferred method have general applicability to a method of altering the shape of an artwork, such as a border or frame. However for ease of explanation, the steps of the preferred method are described with reference to an electronic photo-album program. However it is not intended for the method to be limited to such an application. The method may also have application in many graphics computer processing applications.

The artwork of the preferred method itself is constructed from a number of components, which components have associated alteration rates. These alteration rules indicate how the artwork is to be deformed when the artwork is altered in accordance with the preferred method.

The preferred method has the advantage of a flexible method of reshaping artwork such as frames and borders to fit images or regions of various shapes. More importantly, the preferred method enables a greater flexibility in altering the artwork. For instance, the alteration rules may indicate that a frame component should be stretched, or that points defining the component's shape and position be preserved relative to the artwork's centre, its outside edges or a particular edge.

The inputs to the preferred method are the original artwork and a rectangular target region. Preferably, the artwork is object based and is defined by a tree structure wherein various nodes in the tree have one or more fields storing values. Preferably, the nodes have at least the following fields: source_rectangle; horizontal_rule; vertical_rule: and mapping_restriction. The source_rectangle field indicates whether or not the bounding box associated with that node is the source rectangle. The fields horizontal_rule and vertical_rule store values which designate the type of alteration rules applicable at that node and its sub-nodes. The field mapping_restriction indicates whether a mapping restriction is applicable to that node and its sub-nodes and the type of mapping restriction. Any known object-based artwork software application, which can be adapted to attach one or more fields and associated values to the various nodes, is suitable for constructing such an artwork. These alteration rules operate on the artwork in a manner, which will be described in the section herein entitled "Alteration Rule". In addition, further details concerning the source rectangle and mapping restriction are described below.

Before proceeding with a description of the embodiments, a brief discussion of the preferred structure of the artwork, source and target rectangles is given.

The preferred artwork is described by a tree structure wherein the artist marks various nodes in the tree with alteration rules and it contains a description of a rectangular region in which the artwork is considered to fit. This rectangle is the source rectangle. The input rectangle describes the region that the artwork is required to fit following the execution of the altering method. This is the target rectangle.

The preferred artwork is object-based (rather than pixel-based). The preferred method uses artwork containing three fundamental object types—images, text blocks and bezier spline illustrations—and a number of ways of compositing objects together. The composition of the artwork objects forms a tree, the leaves of which are objects of the fundamental types, and their parent nodes are compositing operators.

Each of the fundamental object types has associated with it a number of points describing its position, shape and size. It is the positions of these points that change during the alteration of the artwork. In the preferred method, both images and text blocks are altered by moving their four corner points, while altering illustration objects involves moving their bezier spline control points. Further to this, text and illustration objects may contain extra points describing colour blend or other information, and these also are moved during alteration. Preferably, when the artwork is altered, the only changes that occur in the tree are to the positional and shape information in the leaf objects.

Figure 1B:
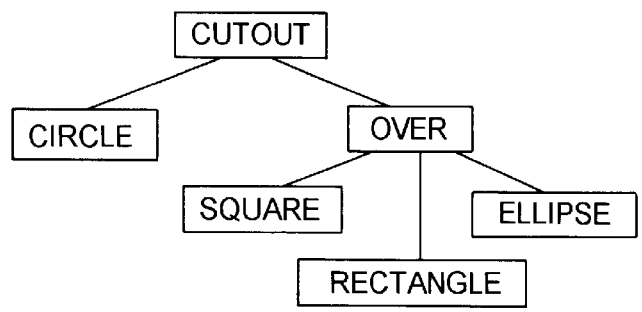

FIGS. 1A and 1B show a simple example of such an artwork and an associated composition tree. The associated composition tree consists of the objects CIRCLE, SQUARE, RECTANGLE and ELLIPSE and the two composition graphical operators 'CUTOUT' and 'OVER'. During the traversal of the tree, the artwork is composited in the following fashion (CIRCLE CUTOUT ((SQUARE OVER (RECTANGLE OVER ELLIPSE))).

Figure 2:
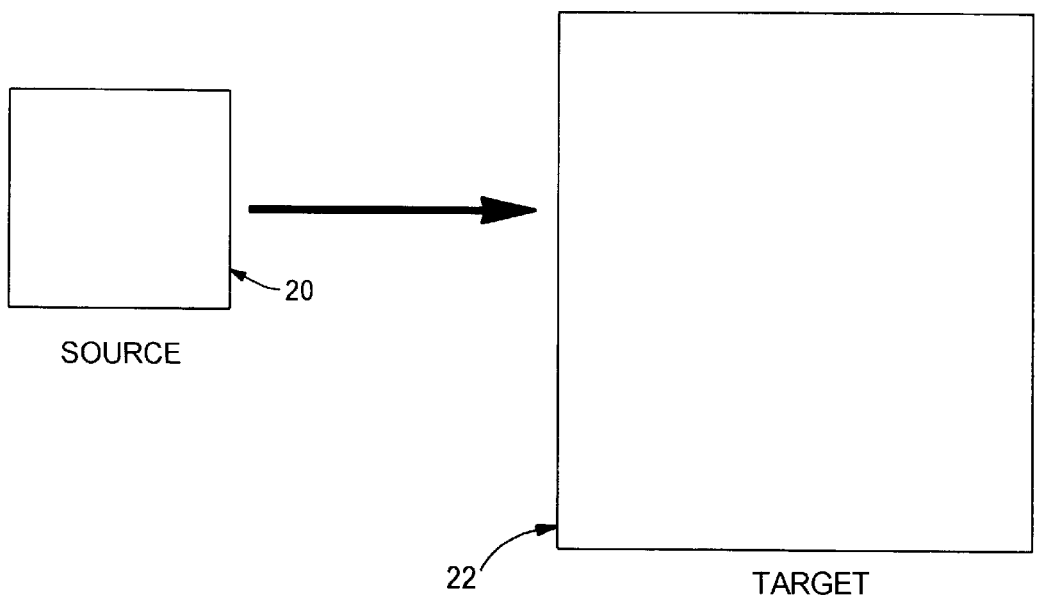
FIG. 2 shows an example of a source rectangle and a target rectangle in accordance with the preferred embodiment.

Turning now to FIG. 2, there is shown a source rectangle 20 and the target rectangle 22. The source rectangle 20 is the region in which the original artwork is considered to fit prior to the preferred altering method. This is a characteristic of the artwork. In the preferred method, any node in the artwork may be marked with a flag as defining the source rectangle in which case the bounding rectangle for that node is used as the source rectangle. This enables the artwork creator to define some artwork components to be outside the source region, which are not affected by the result of altering when some alteration rules are applied. Alternatively, the source rectangle can be the smallest rectangle that contains the entire artwork (that is, the bounding rectangle). A further alternative is to input the size of the source rectangle to the preferred method. The target rectangle provided to the preferred method is generally the region that the artwork is required to fit following alteration. A user preferably selects the size of the target rectangle.

Figure 3A:
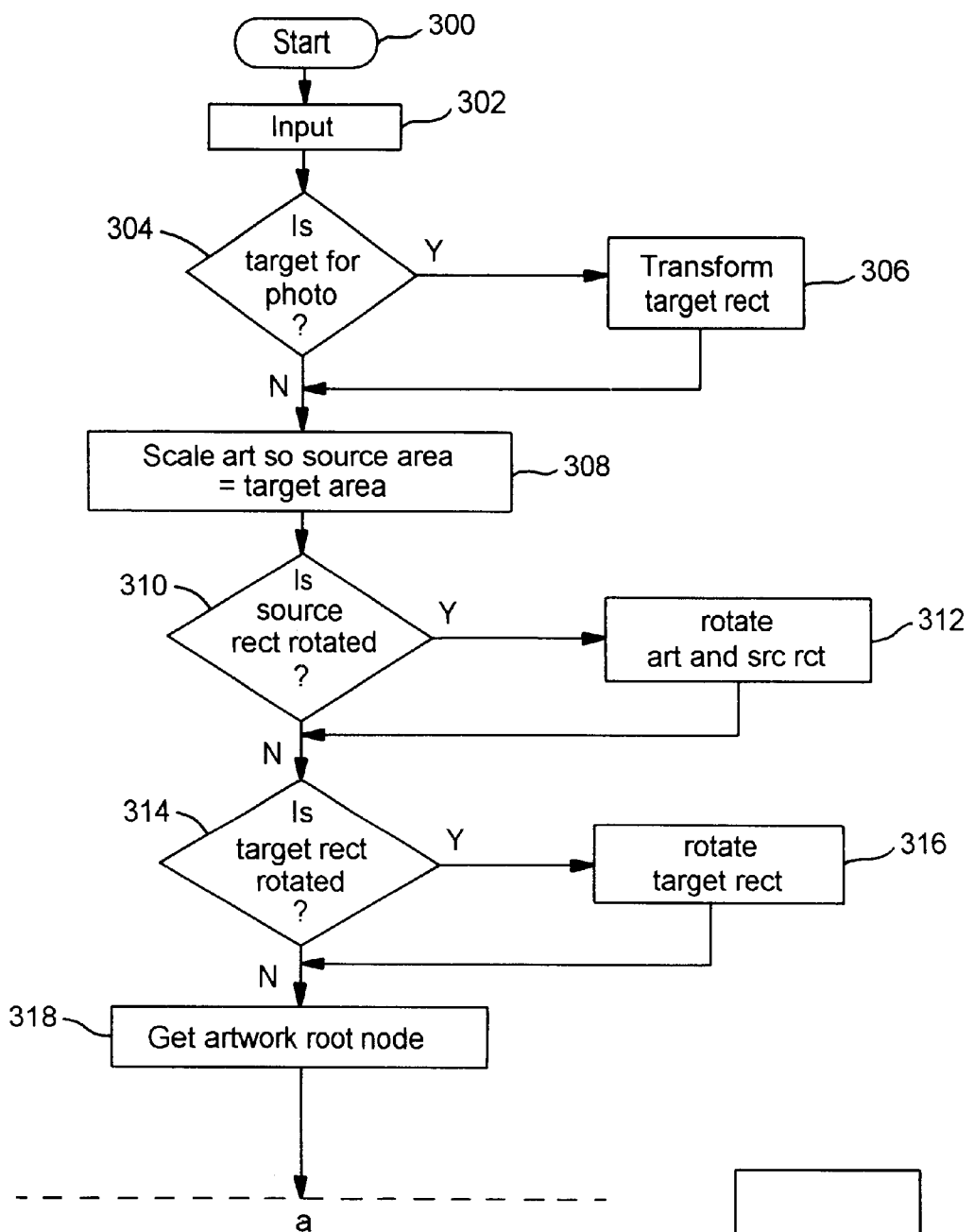
FIGS. 3A and 3B show a flow diagram of a method of altering the shape of an artwork in accordance with the preferred embodiment.
Figure 3B:
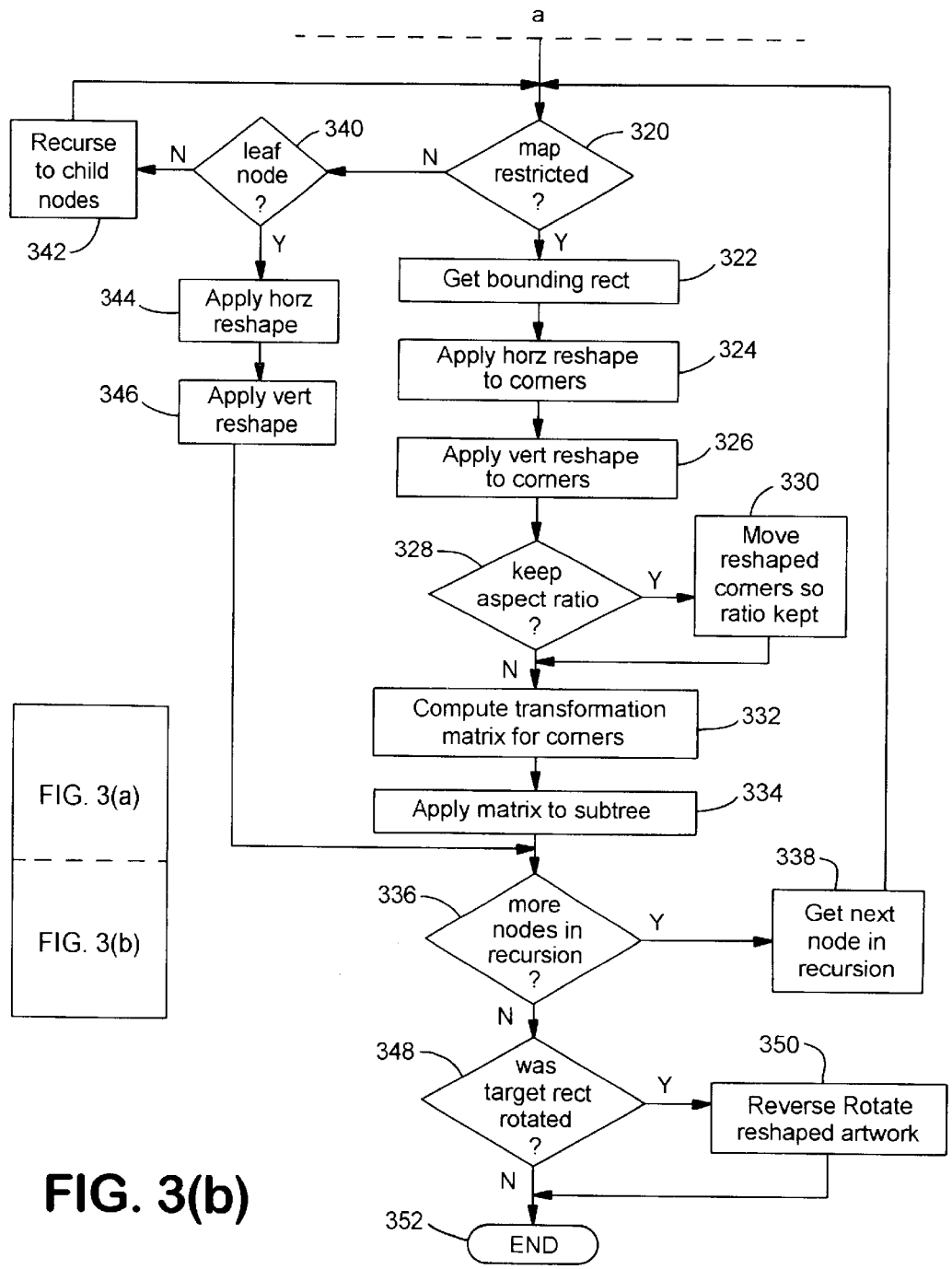

FIGS. 3A and 3B show a flow diagram of the preferred method of altering the shape of an artwork. The preferred method is proposed to interface with an electronic photo-album software on a general purpose computer. The electronic photo-album software does not form part of the invention and will not be described in any detail.

The preferred method commences at 300 where it is called by the electronic photo-album application when a user selects or the application itself selects an artwork to be altered and the size of the target rectangle.

In the next step 302, the selected artwork and size of the target rectangle are input and the processing continues at decision block 304. In the decision block 304, a check is made whether the artwork defines a frame that contains a photograph. If the decision block returns false (no), then the method continues with step 308. On the other hand, if the decision block returns true (yes), the process continues to step 306 where the target rectangle is transformed.

The alteration rules as described in the section herein entitled "Alteration Rules" require the target rectangle to define the intended region for the entire artwork rather than just a photographic component. Consequently, when a target rectangle is selected for the photograph only, this target rectangle must be converted into a corresponding target rectangle for the entire artwork. Thus, the target rectangle for the entire artwork is specified indirectly. This conversion is achieved in step 306 by determining the bounding rectangle of the photographic node of the original artwork and computing an affine transformation matrix, which transforms the positions of the photographic node's corner points in the source rectangle onto the corner points of the target photo. The step 306 then applies his affine transformation to the corners of the source rectangle to obtain the corners of the target rectangle.

FIGS. 4A and 4B illustrate the operations of step 306 of FIG. 3A. FIGS. 4A and 4B show how the target rectangle for the photograph is related to the target rectangle for the artwork. The method step 306 retrieves the bounding rectangle for the node marked as the photo node, then works out an affine transformation matrix that transforms this bounding rectangle to the target rectangle for the photograph. In the examples shown in FIGS. 4A & 4B, the transformation would be a stretch in the y-direction followed by a rotation. Step 306 then applies this transformation to the corner points of the source rectangle to compute the corner points of the target rectangle for the artwork.

The step 306 preferably utilises the following affine transformation matrix for the transformation $(x_1, y_1)$ to $(x_2, y_2)$.

$$\begin{bmatrix} x_2 \\ y_2 \\ 1 \end{bmatrix} = \begin{bmatrix} a & b & t_x \\ c & d & t_y \\ 0 & 0 & 1 \end{bmatrix} \begin{bmatrix} x_1 \\ y_1 \\ 1 \end{bmatrix}$$

Step 306 of the method firstly computes the matrix transforming the photographic image component of the source rectangle to the photographic image component of the target rectangle. The step 306 does this by substituting a corner of the photo of the source rectangle for $(x_1, y_2)$ above and the corresponding point on the target rectangle for $(x_2, y_2)$ to get two equations for the unknowns in the matrix. The method undertakes this substitution for three of the four corners of the photographic rectangles to obtain a set of six equations which can be solved for a, b, c, d, $t_x$ and $t_y$. Step 306 of the preferred method then applies the computed transformation matrix to the corner points describing the source rectangle for the entire artwork to compute the rectangle intended as the target region for the entire artwork. After completion of step 306, the processing continues to step 308 of the preferred method.

In step 308, the method applies a scale factor to the source rectangle and to the entire source artwork so that the scaled source rectangle has the same surface area as the target rectangle. This is done so that the alteration rules of the preferred method achieve consistent results when used to fit artwork to target rectangles of the same aspect ratio but different sizes. Where the surface area of the source rectangle prior to scaling is $S_A$ and the surface area of the target rectangle is $T_A$, applying the following transformation to points in the source rectangle and the source artwork achieves the correct scaling:

$$\begin{bmatrix} x_2 \\ y_2 \end{bmatrix} = \begin{bmatrix} \sqrt{T_A/S_A} & 0 \\ 0 & \sqrt{T_A/S_A} \end{bmatrix} \begin{bmatrix} x_1 \\ y_1 \end{bmatrix}$$

The descriptions of the alteration rules that follow and the calculations for moving points by each rule assume that both the source and target rectangles have no inherent rotation. That is, their sides are parallel to the x and y axes and the bottom edge of each rectangle is horizontal and lower than the top edge. However, the input rectangles may in some instances have a rotation. Steps 312, 316 and 350 of the preferred method compensate for any such rotation.

Thus after completion of step 308, the processing continues at decision block 310 where a check is made whether the source rectangle is rotated with respect to the horizontal. If the source rectangle is not rotated, the decision block 310 returns false (no) and the processing continues to decision block 314. On the other hand, if the source rectangle has a rotation, say of θ degrees, then the decision block 310 returns true (yes) and the processing continues at step 312. In step 312, the source rectangle and the artwork are rotated by −θ degrees, Afterwards, the processing continues at decision block 314. In this way, any inherently rotated source rectangle is rotated to the horizontal before the alteration rules are applied.

In decision block 314, a check is made whether the target rectangle is rotated with respect to the horizontal. If the decision block returns false (no), then the processing continues at step 318. On the other hand, if the target rectangle has a rotation, say of −α degrees, then the decision block 314 returns true (yes) and the processing continues at step 316. In step 316, the target rectangle is rotated by −α degrees. In this way, if the target rectangle is inherently rotated by α degrees with respect to the horizontal, then the target rectangle is rotated by —α degrees before the alteration rules are applied.

The afore mentioned rotation steps 312 and 316 can be achieved using the following transformation (where $(x_1, y_1)$ are the initial point coordinates and $(x_2, y_2)$ are the coordinates after rotation, and θ is the angle by which to rotate):

$$\begin{bmatrix} x_2 \\ y_2 \end{bmatrix} = \begin{bmatrix} \cos\theta & -\sin\theta \\ \sin\theta & \cos\theta \end{bmatrix} \begin{bmatrix} x_1 \\ y_1 \end{bmatrix}$$

After the completion of the rotation steps, the processing continues at step 318.

The preferred method traverses the artwork tree from its root node to each node. The method during that traversal processes each traversed node in turn. The preferred method achieves this by retrieving the root node in step 318 and recursively retrieving the next nodes in steps 342 and 338. If a currently traversed node does not have a mapping restriction, the method will recursively traverse to that node's children 342 until a leaf node is reached. The preferred method will then process that leaf node in steps 344 and 346. After which, the preferred method obtains the next untraversed node, if any, in the recursion. If the currently traversed node has a mapping restriction, all the nodes in its sub-tree are transformed at once by a single matrix 334, so the traversal does not need to recurse through that sub-tree 338. After the completion of steps 338 and 342, the method return to decision block 320 for the processing of the current traversed node.

In decision block 320, a check is made whether the currently traversed node of the artwork tree is marked with a mapping restriction. If the decision block 320 returns false (no) the processing continues to decision block 340. On the other hand, if the decision block 320 returns true (yes) the processing continues at step 322

In decision block 340, a check is made whether the currently traversed node of the artwork tree is a leaf node. If the decision block 340 returns false (no) then the processing continues at step 342, where the next child node in the artwork tree is recursively retrieved. After completion of step 342, the method returns to decision block 320 for fiber processing. On the other hand, if the decision block 340 returns true (yes), then the processing continues at step 344 where horizontal alteration rules are applied. After completion of step 344, the processing continues at step 346 where vertical alteration rules are applied. After completion of the vertical altering step 346, the processing continues at decision block 336. The operation of the vertical and horizontal altering steps 344 and 346 are described in the section herein entitled "Alteration Rules".

As mentioned previously, if the decision block 320 determines that the currently traversed node is marked with a mapping restriction, then the processing continues to step 322. In step 322, the corner points of the currently traversed node's bounding rectangle are retrieved and passed to step 324. In step 324, the horizontal alteration rules associated with the currently traversed node are applied to the corners of the bounding rectangle to determine new horizontal positions for those corners in the target rectangle, Similarly, in step 326 the vertical alteration rules associated with the currently traversed node are applied to the bounding rect-angle to determine the new vertical positions for those corners in the target rectangle.

After step 326, the processing continues at decision block 328, where a check is made whether the aspect ratio of the currently traversed node is to be maintained. If the decision block 328 returns false (no) the method continues at step 332. Otherwise, if the decision block 328 returns true (yes), the method continues at step 330, where the new positions of the corners of the bounding rectangle of the target rectangle are altered so that the aspect ratio is kept. After the completion of step 330, the method continues to step 332.

In step 332, an affine transformation matrix for the corners of the bounding rectangle is determined. This matrix is determined by using the previous and new positions of the corners of the bounding rectangle of the currently traversed node. This matrix may be determined in a similar manner as the matrix in step 306. After step 332, the processing continues at step 334. In step 334, each point of each child node of the currently traversed node is re-positioned into the target rectangle by applying the current transformation to each point.

Thus, when a node in the artwork tree is marked with a mapping restriction, all nodes in the sub-tree of that node undergo a single transformation in order to re-position them in the target rectangle. Furthermore, the mapping restriction can also require that the aspect ratio of the node should be maintained. This can be achieved by indicating in the mapping restriction field to each node the type of restriction, for example a mark indicating that there is a mapping restriction and that the aspect ratio is to be maintained.

The mapping restriction mark can also define whether the aspect ratio is to be maintained by either expanding the region to which the node's corner points are re-positioned or by shrinking that region. That is, if repositioning the corner points of the node onto the target rectangle causes the aspect ratio of the node to change, the target rectangle positions of those points are adjusted before the aforementioned transformation matrix is computed (step 332 ) in order to keep the same aspect ratio. For example, consider that the corners of a square node are repositioned to become a rectangle whose width is twice its height. If the aspect ratio of the node is to be maintained by expanding its region in the target rectangle, the repositioned points will be moved so the rectangle's height is doubled. If the aspect ratio was to be maintained by shrinking the region, the points will be moved so the rectangle's width is halved. The exact changes made to the re-positioned corner points depend on the node's alteration rule for that dimension. If the rule is stretch, preserve outer or preserve inner, the centre-point of the target region is unchanged, If the rule is one of the other preservation rules (for example, preserve top) then the corresponding edge of the region is not moved (so the top edge of the altered region does not change).

FIGS. 5A, 5B, and 5C illustrate examples of a mapping restricted node. FIG. 5A shows a node, which consists of three shapes, before the node is passed to steps 322 to 334. The dotted line surrounding the three shapes in FIG. 5A shows the bounding rectangle of the node, whose corners are marked 1,2,3, and 4. FIG. 5B shows the same node after it has been transformed by step 334. In the latter example, the mapping restriction of the node indicates that the aspect ratio is not to be maintained. FIG. 5C shows the same node after it has been transformed by step 334. However in this example, the mapping restriction of the node indicates that its aspect ratio is to be maintained. If the node's aspect ratio is to be maintained, either the height could be decreased or its width increased. FIG. 5C shows the effect of increasing the node's width to maintain the aspect ratio. This is achieved by moving points 1,2,3, and 4 to the positions shown before computing the affine transformation 332 that is applied 334 to the sub-tree.

After the completion of step 334, the method continues at decision block 336. In decision block 336, a check is made whether there are any more nodes to be traversed in the artwork tree. If the decision block 336 returns true (yes), the processing continues at step 338, where the next node in the recursion is retrieved. After step 338, the processing returns to decision block 320. On the other hand, if the decision block 336 returns false (no), namely there are no more nodes, the processing continues at decision block 348.

The decision block 348 checks whether the target rectangle, that was initially input, was rotated. If the decision block returns true (yes), the processing continues at step 350. In step 350, the altered artwork is rotated by the same amount as the initial target rectangle but in the opposite direction. As such, a non-horizontal target rectangle may be initially input, rotated to the horizontal 316, then the artwork transformed into the target rectangle 318–338, and then the artwork is reverse rotated 350. After step 350, the processing continues at step 352. If the decision block 348, returns false (no), the processing also continues at step 352.

The method to terminates at step 352 and returns the altered artwork to the electronic photo-album application. The altered artwork together with any associated photographs may then be output to a display monitor, or a disk storage, or printed on a printer as the user requests.

Alteration Rules

An alteration rule describes how the preferred method changes the position of the points in objects that the rule concerns. Each object has separate rules for horizontal and vertical altering, so the horizontal and vertical coordinates of points in the object may be subjected to different rules. The altering therefore occurs independently in the two dimensions. These alteration rules may be attached to any node in a composition tree. As mentioned previously, the nodes have fields designating the type of alteration rules. If attached to a composition node rather than a leaf node, the attached alteration rule will be applicable to the sub-tree of that node except any sub-nodes (and the sub-trees of those nodes) with a different rule for altering in the same dimension. For example, the associated alteration rule of a leaf node in its x-direction may be the alteration rule attached to its parent node, whereas the associated alteration rule in its y-direction may be the alteration rule attached to its grandparent node. The preferred method thus applies to a node the relevant associated alteration rule. In a further embodiment, it may be desirable to apply one two-dimensional alteration rule instead of two independent one-dimensional alteration rules.

The way in which a point is moved by an alteration rule depends on its position relative to the source rectangle and how the aspect ratio of that rectangular region relates to the aspect ratio of the target rectangle. The alteration rules assume that the sides of both the source rectangle and the target rectangle are parallel to the horizontal and vertical axes.

When a point is being moved during altering, its horizontal and vertical coordinates are changed independently, according to the horizontal and vertical rules for the object containing the point. The discussion and example diagrams for each rule show the effect of that rule on the vertical positions of the points; the horizontal positions of the points are not changed in the examples but the principles are exactly the same as for vertical positions. The alteration rules are described in the following sections.

Mathematical Definitions for Examples $S_h$ height of source rectangle in mm $T_h$ height of target rectangle in mm $y_S$ y-coordinate of points along the bottom edge of the source rectangle $y_T$ y-coordinate of points along the bottom edge of the target rectangle Note that in the examples, points at the top of a diagram have a greater y-coordinate than points at the bottom.

Stretch

Figure 6A:
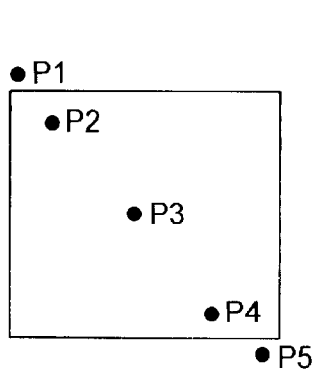

This rule effectively scales point positions relative to the source rectangle so that they have the same positions relative to the target rectangle. The FIGS. 6A, 6B and 6C show examples of how points with different vertical coordinates would be moved during altering if the stretch rule is used. FIG. 6A shows a source rectangle with the initial positions of points P1 . . . P5. FIG. 6B shows a target rectangle, which has greater height than the source rectangle, and shows the positions of P1 . . . P5 after altering. FIG. 6C shows another a target rectangle, which has lesser height than the source rectangle, showing the positions of P1 . . . P5 after altering.

The stretch rule in the vertical (y) dimension can be implemented by applying the scale factor between the target and source rectangle heights to the y-coordinates of the points relative to the bottom of each rectangle. For example, considering the positions of the points being moved relative to the bottom left corner of the rectangles, then points with y-coordinate $y_P$ in the source rectangle will be moved to have y-coordinate $y_T+(y_P-y_S)\times T_h/S_h$ in the target rectangle.

Preserve Outer

The preserve outer rule maintains the positions of points near the outer edges of the source rectangle (that is, near the top and bottom of the source rectangle for vertical altering). This effectively divides the source and target rectangles into bands, as shown in the figures.

Figure 7A:
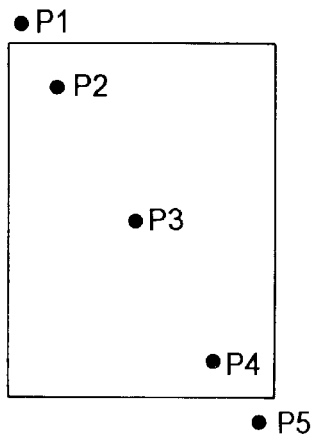
FIGS. 7A and 7B shows an example of how a preserve outer rule re-positions points when the target rectangle is larger than the source rectangle, in accordance with the preferred embodiment.
Figure 7A:
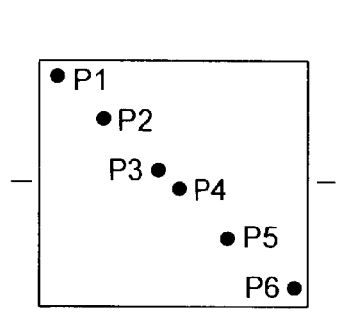
Figure 7B:
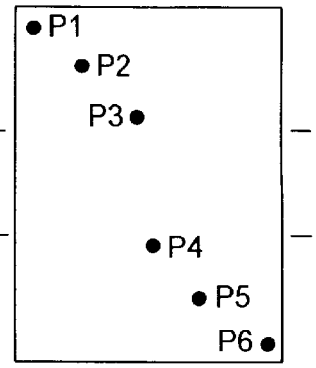

FIGS. 7A and 7B shows an example of how the preserve outer rule re-positions points when the target rectangle is larger than the source rectangle. FIG. 7A shows a source rectangle with initial points P1, . . . ,P6. FIG. 7B shows a target rectangle with points P1, . . . ,P6 after alteration. Points in the top half of the source rectangle (P1 . . . P3) are re-positioned, without being moved relative to one another, in the top $S_h/2$ mm of the target rectangle. Points in the bottom half of the source rectangle (P4 . . . P6) are re-positioned, without being moved relative to one another, in the bottom $S_h/2$ mm of the target rectangle. No points in the source artwork are re-positioned to the middle band of the target rectangle. Points above or below the source rectangle are re-positioned the same distance above or below the target rectangle.

Figure 8A:
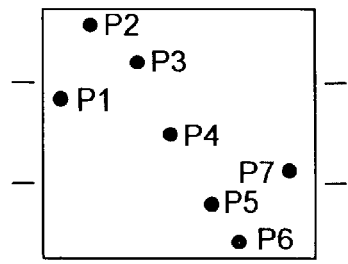
FIGS. 8A and 8B shows an example how the preserve outer rule re-positions points when the target rectangle is smaller than the source rectangle, in accordance with the preferred embodiment.
Figure 8B:
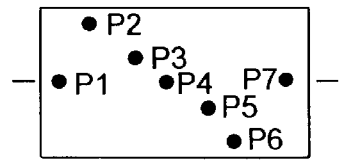

FIGS. 8A and 8B shows an example of how the preserve outer rule re-positions points when the target rectangle is smaller than the source rectangle. FIG. 8A shows a source rectangle with initial points P1, . . . , P7. FIG. 8B shows a target rectangle with points P1, . . . , P7 after alteration. Points in the top $T_h/2$ mm of the source rectangle (P2 and P3) are re-positioned, without being moved relative to one another, in the top half of the target rectangle. Points in the bottom $T_h/2$ mm of the source rectangle (P5 and P6) are re-positioned, without being moved relative to one another, in the bottom half of the target rectangle. Points in the middle band of the source rectangle (P1, P4 and P7) are re-positioned onto the centre line of the target rectangle. Points above or below the source rectangle are re-positioned the same distance above or below the target rectangle.

Because the points in the bands of the artwork that are 'preserved' (that is, the top and bottom bands in this case) do not move relative to one another, the band is not deformed by altering. Where the target rectangle is smaller than the source rectangle, artwork in the middle band of the source rectangle is 'folded' onto the centre line of the target rectangle.

Implementation of the preserve outer rule should compare the sizes of the source and target rectangle, since the bands into which the rectangles are effectively divided are dependent on which is larger. If the source and target rectangles are the same size then all points are simply translated by a constant amount. That is, points with y-coordinate $y_P$ in the source rectangle will be moved to have y-coordinate $y_P+y_T-y_S$ in the target rectangle.

Under the preserve outer rule, when the target rectangle is larger than the source rectangle, points with y-coordinate $y_P$ in the source rectangle:

if $y_P>=y_S+S_h/2$, will map to $y_T+T-(y_S+S_h-y_P)$ in the target rectangle;

if $y_P<y_S+S_h/2$, will map to $y_T+y_P-y_S$.

Under the preserve outer rule, when the target rectangle is larger than the source rectangle, points with y-coordinate $y_P$ in the source rectangle:

if $y_P>=y_S+S_h-T_h/2$, will map to $y_T+T_h-(y_S+S_h-y_P)$ in the target rectangle;

if $y_S+S_h-T_h/2>y_P>=y_S+T_h/2$, will map to $y_T+T_h/2$;

if $y_P<y_S+T_h/2$, will map to $y_T+y_P-y_S$.

Preserve Inner

The preserve inner rule maintains the positions of points around the middle of the artwork. Conceptually it is the opposite of preserve outer. It similarly has the effect of dividing the source and target rectangles into bands, as shown in the FIGS. 9A and 9B.

Figure 9A:
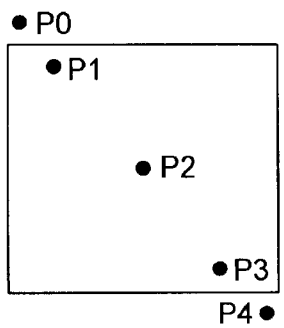
FIGS. 9A and 9B shows an example of the effect of the preserve inner rule when the target rectangle is larger than the source rectangle, in accordance with the preferred embodiment.
Figure 9B:
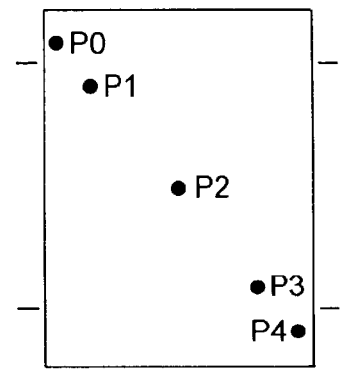

FIGS. 9A and 9B shows an example of the effect of the preserve inner rule when the target rectangle is larger than the source rectangle. FIG. 9A shows a source rectangle with initial points P0, . . . ,P4. FIG. 9B shows a target rectangle with points P0, . . . ,P4 after alteration. In this case, the y-coordinates of the source artwork are re-positioned, without moving relative to one another, so that the entire source rectangle region is re-positioned onto a band of height Sh centred in the target rectangle. Points above or below the source rectangle are repositioned the same distance above or below that band in the target rectangle. Therefore when the target rectangle is larger than the source rectangle, the preserve inner rule causes no deformation of the artwork (in the vertical direction in this case).

Figure 10A:
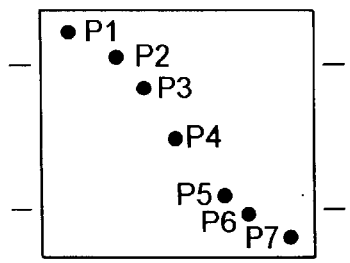
FIGS. 10A and 10B shows an example of the effect of the preserve inner rule when the target rectangle is smaller than the source rectangle, in accordance with the preferred embodiment.
Figure 10B:
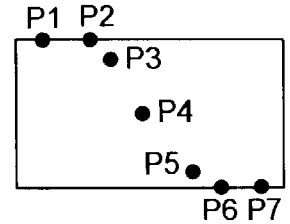

FIGS. 10A and 10B shows an example of the effect of the preserve inner rule when the target rectangle is smaller than the source rectangle. FIG. 10A shows a source rectangle with initial points P1, . . . ,P7. FIG. 10B shows a target rectangle with points P1, . . . ,P7 after alteration. Points in the middle band of the source rectangle (P3 . . . P5), which is of height $T_h$ and is centred in the source rectangle, are re-positioned onto the target rectangle region without moving relative to one another. Points in the upper (P1 and P2) and lower (P6 and P7) bands of the source rectangle, which are of height $(S_h-T_h)/2$, are re-positioned onto the top and bottom edges of the target rectangle respectively. Points above and below the source rectangle are moved onto the top and bottom edges of the target rectangle respectively. That is, the artwork above and below the middle band of the source rectangle is folded onto the edges of the target rectangle.

Like the preserve outer rule, implementation of the preserve inner rule should compare the sizes of the source and target rectangles. As before, if the two rectangles are of the same size, points with y-coordinate $y_P$ in the source rectangle will be moved to $y_P+y_T-y_S$ in the target rectangle.

When the target rectangle is larger than the source rectangle, under the preserve inner rule points with y-coordinate $y_P$ in the source rectangle will map to $y_T+T_h/2+y_P-(y_S+S_h/2)$ in the target rectangle.

Under the preserve inner rule, when the target rectangle is smaller than the source rectangle, points with y-coordinate $y_P$ in the source rectangle:

if $y_P>=y_S+S_h/2+T_h/2$, will map to $y_T+T_h$ in the target rectangle;

if $y_S+S_h/2+T_h/2>y_P>=y_S+S_h/2-T_h/2$, will map to $y_T+T_h/2+y_P-(y_S+S_h/2)$;

if $y_P<y_S+S_h/2, -T_h/2$, will map to $y_T$.

Preserve Left, Preserve Right, Preserve Top, Preserve Bottom

Figure 11A:
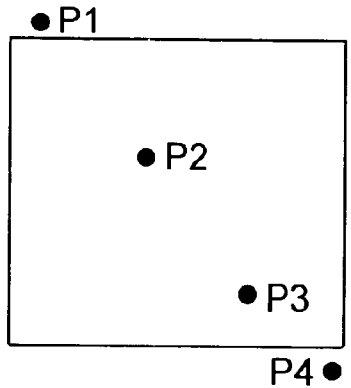
FIGS. 11A and 11B shows an example of the effect of the preserve top rule when the target rectangle is larger than the source rectangle, in accordance with the preferred embodiment.
Figure 11B:
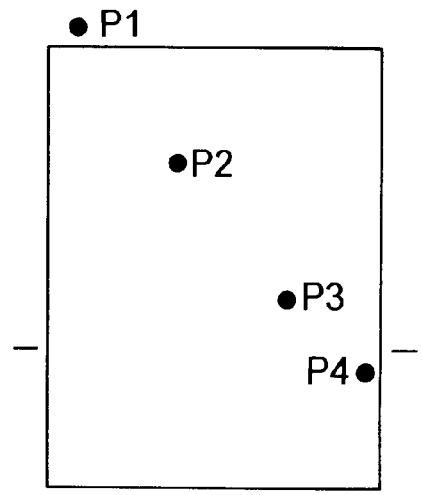

The other 'preservation' alteration rules, preserve left, preserve right, preserve top and preserve bottom, create bands in the artwork in the same manner as preserve outer and preserve inner. FIGS. 11A and 11B shows an example of the preserve top rule being applied. The other preservation rules operate similarly.

FIGS. 11A and 11B shows an example of the effect of the preserve top rule when the target rectangle is larger than the source rectangle. FIG. 11A shows a source rectangle with initial points P1, . . . ,P4. FIG. 11B shows a target rectangle with points P1, . . . ,P4 after alteration. In this case, the y-coordinates of the source artwork are re-positioned, without moving relative to one another, so that the entire source rectangle region is re-positioned onto a band of height $S_h$ at the top of the target rectangle. Points above and below the source rectangle are repositioned the same distance above or below that band in the target rectangle. Therefore when the target rectangle is larger than the source rectangle, the preserve top rule causes no deformation of the artwork (in the vertical direction in this case).

Figure 12A:
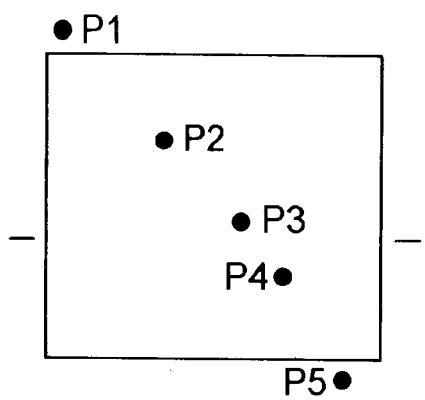
FIGS. 12A and 12B shows an example of the effect of the preserve top rule when the target rectangle is smaller than the source rectangle, in accordance with the preferred embodiment.
Figure 12B:
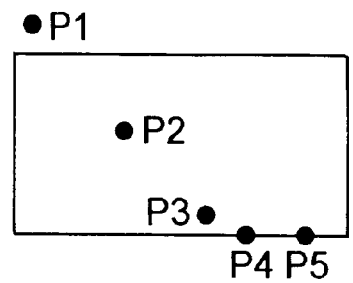

FIGS. 12A and 12B shows an example of the effect of the preserve top rule when the target rectangle is smaller than the source rectangle. FIG. 12A shows a source rectangle with initial points P1, . . . ,P5. FIG. 12B shows a target rectangle with points P1, . . . ,P5 after alteration. Points in the to $T_h$ of the source rectangle are re-positioned, without moving relative to one another, onto the target rectangle. Points above the source rectangle are re-positioned the same distance above the target rectangle. Points in the lower band of the source rectangle or below the source rectangle are re-positioned onto the bottom edge of the target rectangle.

When the target rectangle is larger than the source rectangle, under the preserve top rule points with y-coordinate $y_P$ in the source rectangle will map to $y_T+T_h-S_h+y_P-y_S$.

Under the preserve top rule, when the target rectangle is smaller than the source rectangle, points with y-coordinate $y_P$ in the source rectangle:

if $y_P<=y_S+S_h-T_h$, will map to $y_T+T_h-S_h+y_P-y_S$ in the target rectangle;

if $y_P<y_S+S_h-T_h$, will map to $y_T$ in the target rectangle.

It would be apparent that modifications and/or changes can be made to the flow of the preferred method without departing from the scope and spirit of the invention. For instance, the transformation process 304–306, the scaling process 308, the source rotation process 310–312, and target rotation process 314–316 may be interchanged in any order with each other. Similarly, the horizontal altering step 344 and the vertical altering step 346 are independent and may be interchanged with one another. Furthermore, the flow of the preferred method may be implemented either in parallel or sequentially. For instance, the source rotation process 310–312 and target rotation process 314–316 may be initialised at the same time. In addition, the manner in which all the nodes of the artwork tree are traversed is not essential aspect of the preferred method and many alternatives are possible.

Preferred Embodiment of Apparatus(s)

Figure 13:
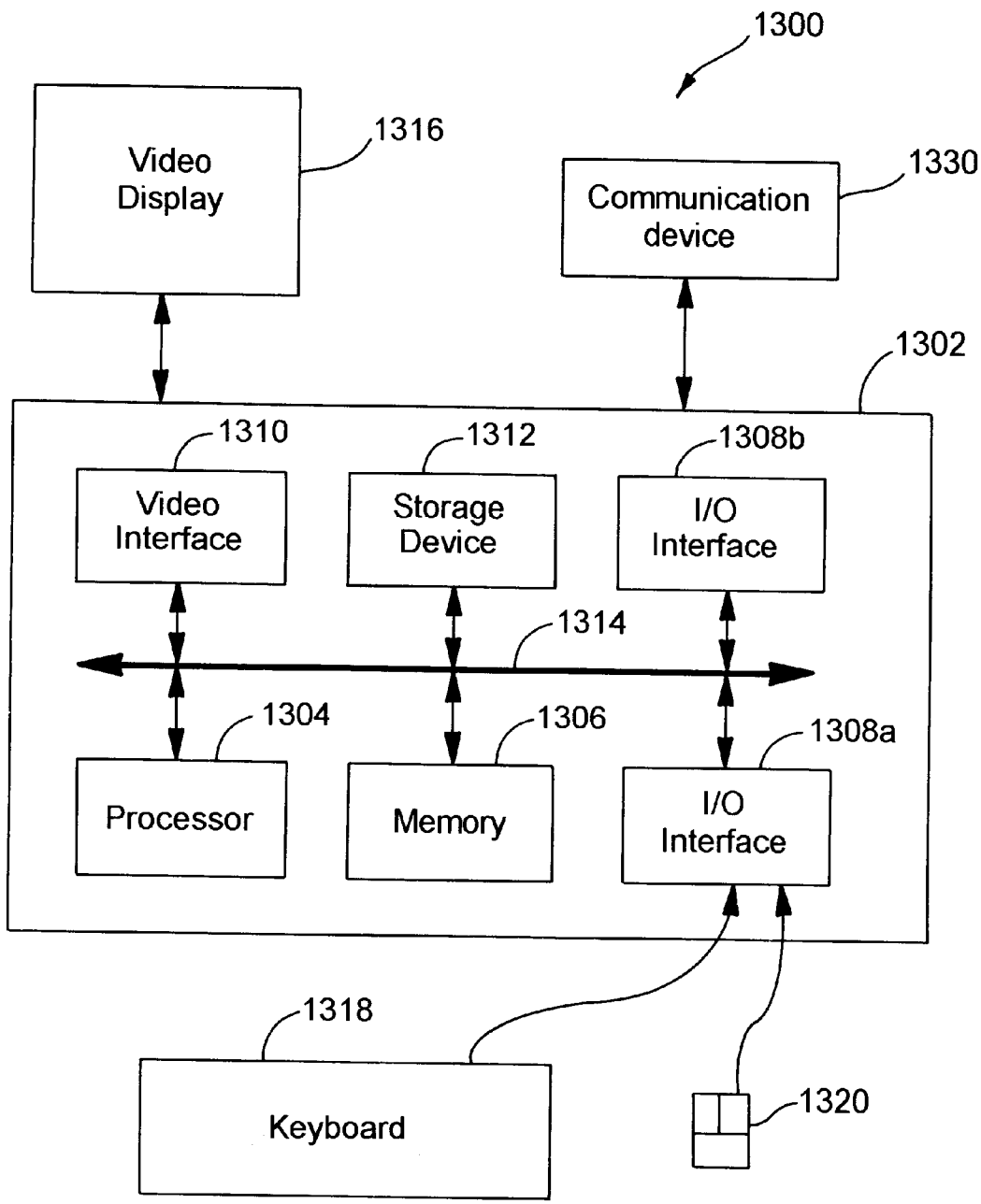
FIG. 13 is a block diagram of a general-purpose computer for implementing the preferred method.

The method of altering the shape of an artwork is preferably practiced using a conventional general-purpose computer, such as the one shown in FIG. 13 wherein the processes of FIGS. 3A and 3B may be implemented as software executing on the computer. In particular, the steps of method of altering the shape of an artwork are effected by instructions in the software that are carried out by the computer. The software may be divided into two separate parts; one part for car out the steps of the altering method; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for altering the shape of an artwork in accordance with the embodiments of the invention.

The computer system 1300 consists of the computer 1302, a video display 1316, and input devices 1318, 1320. In addition, the computer system 1300 can have any of a number of other output devices including lime printers, laser printers, plotters, and other reproduction devices connected to the computer 1302. The computer system 1300 can be connected to one or more other computers via a communication interface 1308b using an appropriate communication channel 1330 such as a modem communications path, a computer network, or the like. The computer network may include a local area network (LAN), a wide area network (WAN), an Intranet, and/or the Internet.

The computer 1302 itself consists of a central processing unit(s) (simply referred to as a processor hereinafter) 1304, a memory 1306 which may include random access memory (RAM) and read-only memory (ROM), input/output (IO) interfaces 1308a, 1308b & 1308c, a video interface 1310, and one or more storage devices generally represented by a block 1312 in FIG. 13. The storage device(s) 1312 can consist of one or more of the following: a floppy disc, a hard disc drive, a magneto-optical disc drive, CD-ROM, magnetic tape or any other of a number of non-volatile storage devices well known to those skilled in the art. Each of the components 1304 to 1312 is typically connected to one or more of the other devices via a bus 1314 that in turn can consist of data, address, and control buses.

The video interface 1310 is connected to the video display 1316 and provides video signals from the computer 1302 for display on the video display 1316. User input to operate the computer 1302 can be provided by one or more input devices 1308b. For example, an operator can use the keyboard 1318 and/or a pointing device such as the mouse 1320 to provide input to the computer 1302.

The system 1300 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing are merely exemplary of the types of computers with which the embodiments of the invention may be practiced. Typically, the processes of the embodiments, described hereinafter, are resident as software or a program recorded on a hard disk drive (generally depicted as block 1312 in FIG. 13) as the computer readable medium, and read and controlled using the processor 1304. Intermediate storage of the program and pixel data and any data fetched from the network may be accomplished using the semiconductor memory 1306, possibly in concert with the hard disk drive 1312.

In some instances, the program may be supplied to the user encoded on a CD-ROM or a floppy disk (both generally depicted by block 1312), or alternatively could be read by the user from the network via a modem device connected to the computer, for example. Still farther, the software can also be loaded into the computer system 1300 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The altering method of FIGS. 3A and 3B may alternatively be implemented in dedicated hardware such as one or more integrated circuits performing the functions or sub functions of FIGS. 3A and 3B. Such dedicated hardware may include graphic processors, digital signal processors, or one or more microprocessors and associated memories.

The foregoing only describes a small number of embodiments of the present invention, however, modifications and/or changes can be made thereto without departing from the scope and spirit of the invention. The present embodiments are, therefore, to be considered in all respects to be illustrative and not restrictive.

We claim:

1. A method of altering the shape of an artwork, wherein the artwork is defined by a tree structure having leaf nodes comprising associated graphical objects and parent nodes comprising associated graphical operators, whereby sub-trees of the tree structure comprise associated graphical objects, wherein each node has fields adapted for storing values indicative of one or more associated alteration rules applicable to that node or that node's sub-tree, the method comprising the steps of:
   selecting a target area for fitting the artwork;
   traversing one or more of the nodes; and
   applying, for each one of the traversed nodes, one or more said alteration rules associated with said traversed node to each point within the graphical object associated with said traversed node to re-position said each point with respect to the target area, thereby altering the shape of the artwork.

2. A method as claimed in claim 1, wherein one or more of said re-positioned points are re-positioned within the target area.

3. A method as claimed in claim 1, wherein said one or more alteration rules comprise two one-dimensional alteration rules.

4. A method as claimed in claim 1, wherein said artwork has associated therewith a source area.

5. A method as claimed in claim 4, wherein said source and target areas are each a right-angled parallelogram.

6. A method as claimed in claim 5, wherein one of said alteration rules comprises a stretch rule, which is adapted to be implemented by applying a scale factor equivalent to the ratio between the target and source parallelogram heights to the y-coordinates of said points of a said traversed node.

7. A method as claimed in claim 5, wherein one of said alteration rules comprises a stretch rule, which is adapted to be implemented by applying a scale factor equivalent to the ratio between the target and source parallelogram widths to the x-coordinates of said points of a said traversed node.

8. A method as claimed in claim 5, wherein one of said alteration rules comprises a preserve outer rule which during the re-positioning ensures that points near the outer edges of the source parallelogram are put near the outer edges of the target parallelogram.

9. A method as claimed in claim 5, wherein one of said alteration rules comprises a preserve inner rule which during the re-positioning ensures that points near the middle of the source parallelogram are put near the middle of the target parallelogram.

10. A method as claimed in claim 5, wherein one of said alteration rules comprises a preserve left rule which during the re-positioning ensures that points near the left of the source parallelogram are put near the left of the target parallelogram.

11. A method as claimed in claim 5, wherein one of said alteration rules comprises a preserve right rule which during the re-positioning ensures that points near the right of the source parallelogram are put near the right of the target parallelogram.

12. A method as claimed in claim 5, wherein one of said alteration rules comprises a preserve top rule which during the re-positioning ensures that points near the top of the source parallelogram are put near the top of the target parallelogram.

13. A method as claimed in claim 5, wherein one of said alteration rules comprises a preserve bottom rule which during the re-positioning ensures that points near the bottom of the source parallelogram are put near the bottom of the target parallelogram.

14. A method as claimed in claim 5, wherein the method, prior to the traversal step and after the selection step, further comprises the steps of:
  rotating the artwork and associated source parallelogram to the horizontal in the event an axis of the parallelogram is not parallel to the horizontal.

15. A method as claimed in claim 5, wherein the method, prior to the traversal step and after the selection step, further comprises the step of:
  rotating the target parallelogram from a non-horizontal orientation to a horizontal orientation.

16. A method as claimed in claim 15, wherein the method, after the application step, further comprises the step of:
  rotating the altered artwork to said non-horizontal orientation.

17. A method as claimed in claim 4, wherein the method, prior to traversal step and after said selection step, further comprises the step of:
  scaling the artwork so that the source area is equal to the target area.

18. A method as claimed in claim 5, wherein the artwork comprises an image and the method, prior to the traversal step and after the selection step, further comprises the step of:
  transforming the target parallelogram for the image to a target parallelogram for the entire artwork.

19. A method of altering the shape of an artwork, wherein the artwork is defined by a tree structure having leaf nodes comprising graphical objects and parent nodes comprising graphical operators, and wherein each node has fields adapted for storing values indicative of one or more alteration rules applicable to that node or its sub-tree, the method comprising the steps of:
  selecting a target area for fitting the artwork;
  traversing one or more of the said nodes; and
  applying, for each one of the traversed nodes that is a leaf node, a said alteration rule to each point within the graphical object comprising the leaf node to re-position said each point in a first direction with respect to the target area, thereby altering the shape of the artwork in said first direction.

20. A method as claimed in claim 19, wherein said method further comprises the step of:
  applying, for each one of the traversed nodes that is a leaf node, a said alteration rule to each point within the graphical object comprising the leaf node to re-position said each point in a second direction with respect to the target area, wherein at least one said graphical object has at least one said alteration rule which is different from at least one said alteration rule of another said graphical object, thereby altering the shape of the artwork in said second direction.

21. A method as claimed in claim 19, wherein said first direction is the horizontal direction.

22. A method as claimed in claim 19, wherein said first direction is the vertical direction.

23. A method as claimed in claim 20, wherein said first direction is the horizontal direction and said second direction is the vertical direction.

24. A method as claimed in claim 19, wherein said artwork has associated therewith a source area.

25. A method as claimed in claim 24, wherein said source and target areas are each a right-angled parallelogram.

26. A method as claimed in claim 25, wherein one of said alteration rules comprises a stretch rule, which is adapted to be implemented by applying a scale factor equivalent to the ratio between the target and source parallelogram heights to the y-coordinates of said points of a said traversed node.

27. A method as claimed in claim 25, wherein one of said alteration rules comprises a stretch rule, which is adapted to be implemented by applying a scale factor equivalent to the ratio between the target and source parallelogram widths to the x-coordinates of said points of a said traversed node.

28. A method as claimed in claim 25, wherein one of said alteration rules comprises a preserve outer rule which during the re-positioning ensures that points near the outer edges of the source parallelogram are put near the outer edges of the target parallelogram.

29. A method as claimed in claim 25, wherein one of said alteration rules comprises a preserve inner rule which during the re-positioning ensures that points near the middle of the source parallelogram are put near the middle of the target parallelogram.

30. A method as claimed in claim 25, wherein one of said alteration rules comprises a preserve left rule which during the re-positioning ensures that points near the left of the source parallelogram are put near the left of the target parallelogram.

31. A method as claimed in claim 25, wherein one of said alteration rules comprises a preserve right rule which during the re-positioning ensures that pints near the right of the source parallelogram are put near the right of the target parallelogram.

32. A method as claimed in claim 25, wherein one of said alteration rules comprises a preserve top rule which during the re-positioning ensures that points near the top of the source parallelogram are put near the top of the target parallelogram.

33. A method as claimed in claim 25, wherein one of said alteration rules comprises a preserve bottom role which during the re-positioning ensures that points near the bottom of the source parallelogram are put near the bottom of the target parallelogram.

34. A method as claimed in claim 25, wherein the method, prior to the traversal and after the selection step, further comprises the step of:

rotating the artwork and associated source parallelogram to the horizontal in the event an axis of the parallelogram is not parallel to the horizontal.

35. A method as claimed in claim 25, wherein the method, prior to the traversal step and after the selection step, further comprises the step of:

rotating the target parallelogram from a non-horizontal orientation to a horizontal orientation.

36. A method as claimed in claim 24, wherein the method, prior to traversal step and after said selection step, further comprises the step of:

scaling the artwork so that the source area is equal to the target area.

37. A method as claimed in claim 25, wherein the artwork comprises an image component and the method, prior to the traversal step and after the selection step, further comprises the step of:

transforming the target parallelogram given by a user for the image to a target parallelogram for the entire artwork.

38. A method of altering the shape of an artwork, wherein the artwork is defined by a tree structure having leaf nodes comprising graphical objects and parent nodes comprising graphical operators, and wherein each node has fields adapted for storing values indicative of one or more horizontal and vertical alteration rules applicable to that node or its sub-tree and a field for storing a value indicative of whether or not a mapping restriction is applicable to that node and its sub-tree if any, the method comprising the steps of:

selecting a target area for fitting the artwork;

traversing one or more of the said nodes;

applying, for each of the traversed nodes that has a value indicating a mapping restriction, an affine transformation to the sub-tree of that node;

applying, for each one of the traversed nodes that is a leaf node and has a value indicating no mapping restriction, a said horizontal alteration rule to each point within the graphical object comprising the leaf node to horizontally re-position said each point with respect to the target area; and applying, for each one of the traversed nodes that is a leaf node and has a value indicating no mapping restriction, a said vertical alteration rule to each point within the graphical object comprising the leaf node to vertically re-position said each point with respect to the target area, thereby altering the shape of the artwork.

39. A method as claimed in claim 38, wherein said step of applying an affine transformation comprises the steps of:

obtaining a bounding box, for each of the traversed nodes that have a mapping restriction;

applying horizontal and vertical alteration rules, for each one of the obtained bounding boxes, to the corners of the bounding box to re-position the corners;

computing an affine transformation matrix from the corners and the re-positioned corners; and applying the computed affine transformation matrix to the sub-tree of the traversed node.

40. A method as claimed in claim 39, wherein said step of applying an affine transformation further comprises, after the application step and prior to the computing step, the following steps:

further re-positioning the corners in order to maintain the aspect ratio of the image associated with the traversed node, in the event the traversed node has a field value indicating that the aspect ratio is to be maintained.

41. A method of adapting for later alteration an artwork, wherein the artwork is defined by a tree structure having leaf nodes comprising graphical objects and parent nodes comprising graphical operators, and the method comprises the steps of:

attaching one or more fields to each node for designating horizontal and vertical alteration rules applicable to that node or its sub-tree; and adding values to said one or more fields indicative of a said horizontal and vertical alteration, wherein the artwork is adapted to be altered in accordance with said alteration rules.

42. A method as claimed in claim 41, wherein the method further comprises:

attaching a field to each node for storing a value indicative of whether or not a mapping restriction is applicable to that node and its sub-tee.

43. A method as claimed in claim 41, wherein the method further comprises:

attaching a field to each node for storing a value indicative of whether the bounding box of that node is a source rectangle within which the artwork fits.

44. Apparatus for altering the shape of an artwork, wherein the artwork is defined by a tree structure having leaf nodes comprising associated graphical objects and parent nodes comprising associated graphical operators, whereby sub-trees of the tree structure comprise associated graphical objects, wherein each node has fields adapted for storing values indicative of one or more associated alteration rules applicable to that node or that node's sub-tree, the apparatus comprising:

means for selecting a target area for fitting the artwork;

means for traversing one or more of said nodes; and means for applying, for each one of the traversed nodes, one or more said alteration rules associated with said traversed node to each point within the graphical object associated with said traversed node to re-position said each point with respect to the target area, thereby altering the shape of the artwork.

45. Apparatus for altering the shape of an artwork, wherein the artwork is defined by a tree structure having leaf nodes comprising graphical objects and parent nodes comprising graphical operators, and wherein each node has fields adapted for storing values indicative of one or more alteration rules applicable to that node or its sub-tree, the apparatus comprising:

means for selecting a target area for fitting the artwork;

means for traversing one or more of the said nodes; and means for applying, for each one of the traversed nodes that is a leaf node, a said alteration rule to each point within the graphical object comprising the leaf node to re-position said each point in a first direction with respect to the target area, thereby altering the shape of the artwork in said first direction.

46. Apparatus for altering the shape of an artwork, wherein the artwork is defined by a tree structure having leaf nodes comprising graphical objects and parent nodes comprising graphical operators, and wherein each nude has fields adapted for storing values indicative of one or more horizontal and vertical alteration rules applicable to that node or its sub-tree and a field for storing a value indicative of whether or not a mapping restriction is applicable to that node and its sub-tree if any, the apparatus comprising:

means for selecting a target area for fitting the artwork;

means for traversing one or more of the said nodes;

means for applying, for each of the traversed nodes that has a value indicating a mapping restriction, an affine transformation to the sub-tree of that node;

means for applying, for each one of the traversed nodes that is a leaf node and has a value indicating no mapping restriction, a said horizontal alteration rule to each point within the graphical object comprising the leaf node to horizontally re-position said each point with respect to the target area; and means for applying, for each one of the traversed nodes that is a leaf node and has a value indicating no mapping restriction, a said vertical alteration rule to each point within the graphical object comprising the leaf node to vertically re-position said each point with respect to the target area, thereby altering the shape of the artwork.

47. Apparatus for adapting for later alteration an artwork, wherein the artwork is defined by a tree structure having leaf nodes comprising graphical objects and parent nodes comprising graphical operators, and the apparatus comprises:

means for attaching one or more fields to each node for designating horizontal and vertical alteration rules applicable to that node or its sub-tree; and means for adding values to said one or more fields indicative of a said horizontal and vertical alteration, wherein the artwork is adapted to be altered in accordance with said alteration rules.

48. A computer readable medium comprising a computer program for altering the shape of an artwork, wherein the artwork is defined by a tree structure having leaf nodes comprising associated graphical objects and parent nodes comprising associated graphical operators, whereby sub-trees of the tree structure comprise associated graphical objects, and wherein each node has fields adapted for storing values indicative of one or more associated alteration rules applicable to that node or that node's sub-tree, the computer program comprising:

means for selecting a target area for fitting the artwork;

means for traversing one or more of said nodes; and means for applying, for each one of the traversed nodes, one or more said alteration rules associated with said traversed node to each point within the graphical object associated with said traversed node to re-position said each point with respect to the target area, thereby altering the shape of the artwork.

49. A computer readable medium comprising a computer program for altering the shape of an artwork, wherein the artwork is defined by a tree structure having leaf nodes comprising graphical objects and parent nodes comprising graphical operators, and wherein each node has fields adapted for storing values indicative of one or more alteration, rules applicable to that node or its sub-tree, the computer program comprising:

means for selecting a target area for fitting the artwork;

means for traversing one or more of the said nodes; and means for applying, for each one of the traversed nodes that is a leaf node, a said alteration rule to each point within the graphical object comprising the leaf node to re-position said each point in a first direction with respect to the target area, thereby altering the shape of the artwork in said first direction.

50. A computer readable medium comprising a computer program for altering the shape of an artwork, wherein the artwork is defined by a tree structure having leaf nodes comprising graphical objects and parent nodes comprising graphical operators, and wherein each node has fields adapted for storing values indicative of one or more horizontal and vertical alteration rules applicable to that node or its sub-tree and a field for storing a value indicative of whether or not a mapping restriction is applicable to that node and its sub-tree if any, the computer program comprising:

means for selecting a target area for fitting the artwork;

means for traversing one or more of the said nodes;

means for applying, for each of the traversed nodes that has a value indicating a mapping restriction, an affine transformation to the sub-tree of that node;

means for applying, for each one of the traversed nodes that is a leaf node and has a value indicating no mapping restriction, a said horizontal alteration rule to each point within the a graphical object comprising the leaf node to horizontally re-position said each point with respect to the target area; and means for applying, for each one of the traversed nodes that is a leaf node and has a value indicating no mapping restriction, a said vertical alteration rule to each point within the graphical object comprising the leaf node to vertically re-position said each point with respect to the target area, thereby altering the shape of the artwork.

51. A computer readable medium comprising a computer program for adapting for later alteration an artwork, wherein the artwork is defined by a tree structure having leaf nodes comprising graphical objects and parent nodes comprising graphical operators, and the computer program comprises:

means for attaching one or more fields to each node for designating horizontal and vertical alteration rules applicable to that node or its sub-tree; and means for adding values to said one or more fields indicative of a said horizontal and vertical alteration, wherein the artwork is adapted to be altered in accordance with said alteration rules.

* * * * *

UNITED STATES PATENT AND TRADEMARK OFFICE
CERTIFICATE OF CORRECTION

PATENT NO. : 6,642,923 B1
DATED : November 4, 2003
INVENTOR(S) : Lincoln David Stone et al.

It is certified that error appears in the above-identified patent and that said Letters Patent is hereby corrected as shown below:

Title page,
Item [57], ABSTRACT,
Lines 14 and 18, "whereby" should read -- thereby --.

Column 3,
Line 13, "explains" should read -- explain --; and
Lines 23, 27, 31, 35, 40 and 44, "shows" should read -- show --.

Column 7,
Line 47, "Fiber" should read -- Further --.

Column 9,
Line 20, "a" should be deleted; and
Line 25, "to" should be deleted.

Column 10,
Line 51, "shows" should read -- show --.

Column 11,
Lines 34 and 48, "shows" should read -- show --.

Column 13,
Line 32, "lime" should read -- line --.

Column 17,
Line 6, "role" should read -- rule --.

Column 18,
Line 29, "sub-tee" should read -- sub-tree --.

Column 19,
Line 4, "nude" should read -- node --.

UNITED STATES PATENT AND TRADEMARK OFFICE
CERTIFICATE OF CORRECTION

PATENT NO. : 6,642,923 B1
DATED : November 4, 2003
INVENTOR(S) : Lincoln David Stone et al.

It is certified that error appears in the above-identified patent and that said Letters Patent is hereby corrected as shown below:

Column 20,
Line 5, "alteration," should read -- alterations, --.

Signed and Sealed this

Twentieth Day of April, 2004

JON W. DUDAS
*Acting Director of the United States Patent and Trademark Office*